(12) United States Patent
Yamawaki et al.

(10) Patent No.: US 7,444,123 B2
(45) Date of Patent: Oct. 28, 2008

(54) TRANSMITTER AND MOBILE COMMUNICATION TERMINAL USING THE SAME

(75) Inventors: Taizo Yamawaki, Tokyo (JP); Yoshiaki Harasawa, Maebashi (JP)

(73) Assignee: Renesas Technology Corp., Tokyo (JP)

( * ) Notice: Subject to any disclaimer, the term of this patent is extended or adjusted under 35 U.S.C. 154(b) by 475 days.

(21) Appl. No.: 11/335,510

(22) Filed: Jan. 20, 2006

(65) Prior Publication Data
US 2006/0189284 A1  Aug. 24, 2006

(30) Foreign Application Priority Data
Feb. 23, 2005 (JP) .............................. 2005-047485

(51) Int. Cl.
*H01Q 11/12* (2006.01)
*H04B 1/04* (2006.01)
(52) U.S. Cl. ................. 455/127.2; 455/126; 455/552.1; 330/99; 330/291
(58) Field of Classification Search ................ 455/126, 455/127.1, 127.2, 127.3, 232.1, 234.1, 240.1, 455/552.1, 553.1; 330/75, 98, 99, 100, 103, 330/250, 277, 278, 282, 291, 310; 375/295, 375/297, 345
See application file for complete search history.

(56) References Cited

U.S. PATENT DOCUMENTS 5,467,057 A * 11/1995 Joardar ....................... 330/254
6,057,735 A * 5/2000 Cloutier ....................... 330/279
6,930,549 B2 * 8/2005 Kajiwara et al. ............ 330/254
7,062,236 B2 * 6/2006 Midtgaard et al. .......... 455/126
7,084,704 B2 * 8/2006 Sowlati ....................... 330/253
7,209,717 B2 * 4/2007 Okada et al. ................ 455/126
2003/0224740 A1  12/2003  Takano et al. ............... 455/102

FOREIGN PATENT DOCUMENTS

JP  2004-007443 A  1/2004

OTHER PUBLICATIONS

Behzad Razavi, "RF Transmitter Architectures and Circuits", IEEE 1999 Custom Integrated Circuits Conferences, pp. 197-204.
Tirdad Sowlati, "Quad-Band GSM/GPRS/EDGE Polar Loop Transmitter", 2004 IEEE International Solid-State Circuits Conference, 10 pages.

* cited by examiner

*Primary Examiner*—Quochien B Vuong
(74) *Attorney, Agent, or Firm*—Miles & Stockbridge P.C.

(57) ABSTRACT

With a dual mode transmitter capable of handling two modulation methods for nonconstant amplitude modulation and constant amplitude modulation, respectively, speed-up of transition between modes is implemented. In a mode handling the constant amplitude modulation, first capacitors included in a low-pass filter constituting an AM loop, and a second capacitor included in an integrator are kept recharged from a first constant-voltage power supply and a second constant-voltage power supply by use of a first switch and a second switch, respectively. By doing so, a value of voltage to be recharged at the time of a mode changeover is decreased, and further, a first variable-gain amplifier starts control of a gain while avoiding a region where the output voltage of the first variable-gain amplifier has slow response against an input voltage.

11 Claims, 8 Drawing Sheets

TRANSMITTER AND MOBILE COMMUNICATION TERMINAL USING THE SAME

CLAIM OF PRIORITY

The present application claims priority from Japanese application JP 2005-047485 filed on Feb. 23, 2005, the content of which is hereby incorporated by reference into this application.

CROSS-REFERENCE TO RELATED APPLICATION

This application is related to U.S. application Ser. No. 11/210,734 filed on Aug. 25, 2005, the disclosure of which is hereby incorporated by reference.

FIELD OF THE INVENTION

The invention relates to a transmitter capable of coping with dual modes (two methods) of a constant amplitude modulation method, and a nonconstant amplitude modulation method, and changing over between the modes at a high speed, and a mobile communication terminal using the same.

BACKGROUND OF THE INVENTION

In the case of adopting a constant amplitude transmission signal by GMSK (Gaussian Minimum Shift Keying) modulation, and so forth, for mobile communications such as a cellular telephone, and so forth, much use is being made of an offset PLL (Phase Locked Loop) in a transmission circuit. With the offset PLL, a modulation signal is converted into one at a transmission frequency by applying modulation to a voltage-controlled oscillator as described in, for example, "RF Transmitter Architectures and Circuits" by Behzard Razavi, "IEEE 1999 Custom Integrated Circuits Conference" papers, 1999, pp. 197-204.

Further, as an example of a configuration of a transmitter for a conventional dual mode terminal adopting a constant amplitude modulation method by the GMSK modulation, and a nonconstant amplitude modulation method by an 8 PSK (Phase Shift Keying) modulation, there is cited an example of a configuration provided with a phase control loop (phase feedback loop) for controlling a phase of an output signal of a voltage-controlled oscillator by feedback, and an envelope feedback loop (amplitude control loop) for controlling a gain of a power amplifier for amplifying the output signal by feedback (refer to, for example, JP-A No. 7443/2004).

SUMMARY OF THE INVENTION

The mobile communications centering round a speech service have achieved an explosive increase in the number of subscribers during the last decade. Such a communications system includes GSM (Global System for Mobile Communications) Meanwhile, there have lately arisen the needs for not only the speech service, but also fast data communication, and an image service. With the GSM system, there is anticipated a shift from a method using the conventional GMSK modulation, which is the constant amplitude modulation, to an EDGE (Enhanced Data for Global Evolution) system using the 8 PSK (Phase Shift Keying) modulation of multi-value and multi-phase, at a nonconstant amplitude. It is essential that a terminal capable of coping with the EDGE system is a dual mode terminal capable of coping with two systems of the conventional GSM (GMSK modulation at a constant amplitude), and the EDGE system (the 8 PSK modulation at a nonconstant amplitude).

Figure 6:
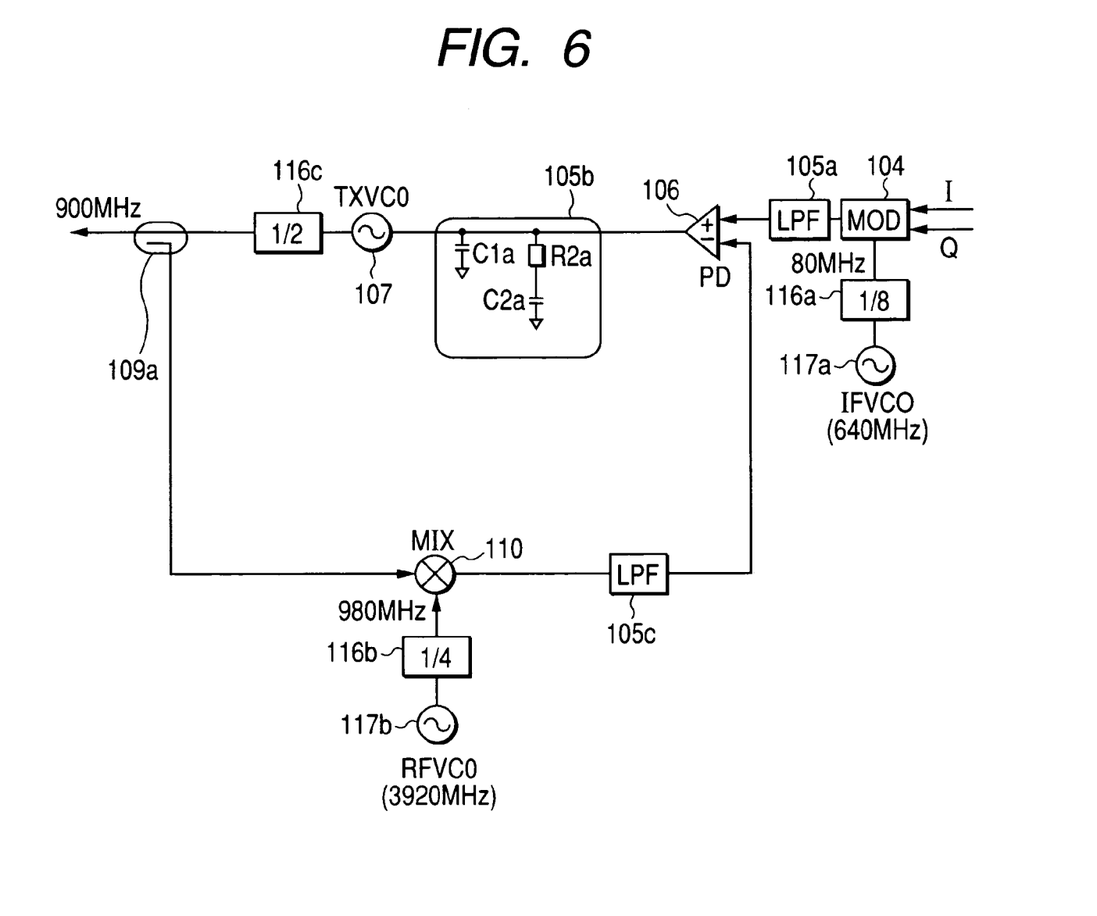
FIG. 6 is a block diagram for describing a conventional offset PLL transmitter.

A transmission method used in the GSM system includes the offset PLL method described as above. FIG. 6 is a block diagram showing the representative configuration thereof. Reference numeral 104 denotes a quadrature modulator (hereinafter referred to as MOD) for executing quadrature modulation of baseband I, Q signals (input signals), as modulation signals, by use of a first carrier at an intermediate frequency (hereinafter referred to as IF frequency) of 80 MHz to thereby converts a center frequency of the base band I, Q signals into the IF frequency. The first carrier is generated by use of a voltage-controlled oscillator (hereinafter referred to as IFVCO) 117a oscillating at the IF frequency, and a ⅛-divider 116a. More specifically, the IFVCO 117a oscillates at, for example, 640 MHz, and an output signal frequency of the IFVCO 117a is divided by one eighth with the ⅛-divider 116a to thereby generate the first carrier at 80 MHz. The output signal frequency of the IFVCO 117a is generally stabilized by use of a synthesizer circuit. An unnecessary signal component of a quadrature modulation signal outputted by the MOD 104 is restrained by a low-pass filter (hereinafter referred to as LPF) 105a. As the LPF 105a is intended for restraining the unnecessary signal component, the LPF 105a may be, for example, a band-pass filter (hereinafter referred to as BPF).

Reference numeral 106 denotes a phase comparator (hereinafter referred to as PD), to which a quadrature modulation signal outputted by the LPF 105a is inputted as a reference signal. A feedback signal as well is inputted to the PD 106, and the PD 106 outputs a current proportional to a phase difference between those two signals as inputted. The current is converted into a voltage by a LPF 105b. The LPF 105b comprises a capacitor C1a, a resistor R2a, and a capacitor C2a. Reference numeral 107 denotes a voltage-controlled oscillator (hereinafter referred to as TXVCO) for outputting a transmission signal at a desired frequency, and a ½-divider 116c is a circuit for dividing an output signal frequency of the TXVCO 107 by one half.

A signal branch circuit 109a is a circuit for branching an output signal from the ½-divider 116c in two directions, one being outputted as an output signal of an offset PLL transmitter, and the other being inputted to a mixer (hereinafter referred to as MIX) 110. The signal branch circuit 109a is implemented by a coupler using, for example, a microstrip line or a signal branch circuit using capacitors. The MIX 110 down-converts (converts a frequency into a lower frequency) a signal inputted thereto by use of a second carrier. An output signal of the MIX 110 is inputted to the PD 106 as a feedback signal via an LPF 105c for restraining an unnecessary signal component.

The PD 106, LPF 105b, TXVCO 107, ½-divider 116c, MIX 110, and LPF 105c form a phase feedback loop (hereinafter referred to as PM loop) controlling such that the reference signal inputted to the PD 106 becomes equal in frequency and phase to the feedback signal. Further, in the case of a voltage-controlled oscillator (hereinafter referred to as RFVCO) 117b oscillating at, for example, 3920 MHz, the frequency of a second carrier inputted to the MIX 110 comes to be at 980 MHz.

As respective frequencies of two inputs to the PD 106 are controlled so as to be identical to each other through the PM loop, the PM loop is stabilized with a MIX input frequency at 900 MHz, that is, with a TXVCO 107 output frequency at 1.8 GHz. In other words, the offset PLL transmitter has a function of up-converting (converting a frequency into a higher frequency) the center frequency of the reference signal into a desired transmission frequency while maintaining modulation information contained in the reference signal. Further, because the feedback loop operates as a band-pass filter for a narrow band against the reference signal inputted to the PD 106, an output signal of the offset PLL transmitter can be lowered in noise.

With an example of the offset PLL method, the TXVCO 107 is an oscillator, and since the output amplitude of an oscillator is generally constant, the offset PLL method is applied to the GSM system making use of constant amplitude GMSK modulation.

In the case of transmitting an 8-PSK modulation signal at a nonconstant amplitude at the transmitter for the conventional dual mode terminal as described in JP-A No. 7443/2004, an output signal of a voltage-controlled oscillator such as the TXVCO 107, controlling the phase and frequency of an oscillation signal, is inputted to a power amplifier, and a gain of the power amplifier is controlled by feedback using an envelope of the 8-PSK modulation signals. An envelope feedback loop (hereinafter referred to as an AM loop) is formed by the feedback using the envelope. By operating only the PM loop in the case of the constant amplitude modulation, and operating both the PM loop, and the AM loop in the case of the nonconstant amplitude modulation, application to both the constant amplitude modulation method, and the nonconstant amplitude modulation is enabled.

Figure 7:
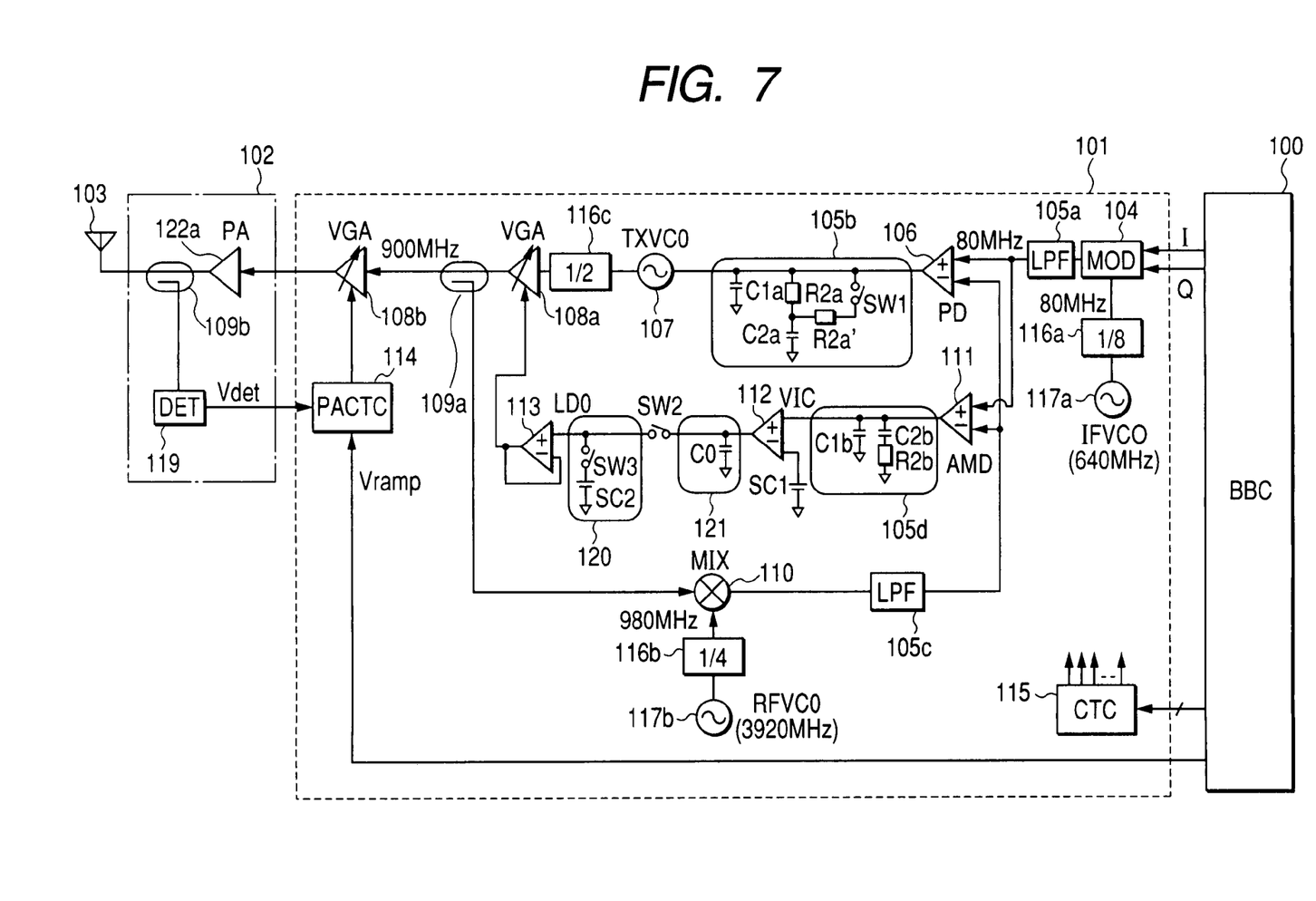
FIG. 7 is a block diagram for describing an example of the configuration of a transmitter, studied by the inventor prior to the development of the present invention.

Prior to development of the present invention, one of the inventors has examined a configuration for a dual mode terminal wherein a gain of a power amplifier is fixed, and a variable-gain amplifier handling a small power is disposed in a stage preceding the power amplifier. FIG. 7 shows an example of the configuration. The example of the configuration is applicable to both GSM system of constant amplitude modulation, and the EDGE system of nonconstant amplitude modulation.

With the present example of the configuration, there are first disposed a PD 106, and a MOD 104 as well as an LPF 105a (a first filter), for generating a reference signal to an envelope comparator (hereinafter referred to as AMD) 111 for outputting an output current corresponding to a difference between respective envelope voltages of two input signals. The MOD 104 and LPF 105a receive baseband I, Q signals (the input signals) outputted from a baseband circuit (hereinafter referred to as BBC) 100 to thereby generate the reference signal through quadrature modulation. Further, there are disposed an IFVCO 117a, and a ⅛-divider 116a, for generating a carrier to be sent out to the MOD 104. In addition, there are disposed an RFVCO 117b, and a ¼-divider 116b, for generating a local signal (carrier) to a MIX 110. As a result, there is formed a PM loop including the PD 106, an LPF 105b, a TXVCO 107, a ½-divider 116c, a variable-gain amplifier (hereinafter referred to as VGA) (first variable-gain amplifier) 108a, a signal branch circuit 109a, the MIX 110, and an LPF 105c. In this case, the LPF 105b comprises a switch (hereinafter referred to as SW) 1 for shorting (short-circuiting) at the time of transmitting a signal for the nonconstant amplitude modulation, and a resistor R2a' besides a capacitor C1a, a resistor R2a, and a capacitor C2a.

With the present example of the configuration, there are further disposed the AMD 111, an LPF 105d, a voltage-to-current converter (hereinafter referred to as VIC) 112, an integrator 121, an SW 2, a constant-voltage circuit 120, and a buffer amplifier (hereinafter referred to as LDO) 113. The LPF 105d is for restraining unnecessary signals out of an output current of the AMD 111, and concurrently executing current-to-voltage conversion. Further, the LPF 105d comprises a resistor R2b, and capacitors (first capacitors) C1b, C2b. The VIC 112 has a minus (negative) input terminal connected to a constant-voltage power supply (hereinafter referred to as SC) 1 (a first power supply), and a plus (positive) input terminal for receiving an output signal of the LPF 105d, thereby converting a difference in voltage between the plus input terminal, and the minus input terminal into a current to be then outputted. The integrator 121 functions as an ideal integrator, including a capacitor C0 (a second capacitor). The integrator 121 is a kind of filter because the higher a frequency, the greater attenuation it undergoes. The constant-voltage circuit 120 comprises an SW3, and an SC2 (a second power supply). The LDO 113 is an amplifier for driving the VGA 108a, and the output signal of the LDO 113 is inputted to the control terminal of the VGA 108a. The VGA 108a has its gain controlled by the output signal of the LDO 113. Now, there is formed an AM loop including the AMD 111, LPF 105d, VIC 112, integrator 121, SW2, constant-voltage circuit 120, LDO 113, VGA 108a, signal branch circuit 109a, MIX 110, and LPF 105c.

Next, the output signal (transmission signal) of the VGA 108a is inputted to a VGA (second variable-gain amplifier) 108b via the signal branch circuit 109a. The gain of the VGA 108b, against average power of the transmission signals whose envelope undergoes a change, is controlled by an input voltage to the control terminal thereof, thereby controlling an average output power thereof. The output signal of the VGA 108a with the average output power thereof under control is inputted to a fixed-gain power amplifier (hereinafter referred to as fixed-gain PA) 122a. The gain of the fixed-gain PA 122a does not undergo a continuous change owing to a control potential, however, there can the case where the fixed-gain PA 122a has a different gain depending on whether operation is in the GSM mode or the EDGE mode, or the case where the fixed-gain PA 122a has discrete gains even in the same mode, for example, the case where it has three different gains depending on an output power level in the GSM mode. The output signal of the fixed-gain PA 122a is sent out to an antenna 103, and a power detection circuit (hereinafter referred to as DET) 119 via a signal branch circuit 109b. The DET 119 detects a signal inputted thereto, and inputs a detection voltage Vdet to a PA output power control circuit (hereinafter referred to as PACTC) 114. At the PACTC 114, a control voltage Vramp inputted from the BBC 100 is compared with Vdet, and a signal corresponding to a difference therebetween is supplied to the control terminal of the VGA 108b. The VGA 108b, fixed-gain PA 122a, signal branch circuit 109b, DET 119, and PACTC 114 form a PA output power control feedback loop, which is capable of controlling a PA output power level by the voltage Vramp.

With the configuration shown in FIG. 7, a range surrounded by a broken line represents a transmitter 101, and a range surrounded by a dash and dotted line represents a power amplification section 102. Control of operations of respective circuits included in the transmitter 101, such as the operating state (ON), the non-operational state (OFF), and so forth, is determined on the basis of a signal inputted from the BBC 100 to a control circuit (CTC) 115.

Next, an operation of the present example of the configuration is described hereinafter. First, an operation in the EDGE mode is described.

In the case of the EDGE mode, as the modulation signal handles the 8-PSK of the nonconstant amplitude modulation, both the AM loop and the PM loop comes to be in the operating state. Further, the SW2 comes to be in the shorted state, and connection is made such that the output signal of the VIC 112, passing through the integrator 121, is delivered to the LDO 113, whereupon the SW3 comes to be in the open (release) condition to thereby cause the SC2 to be in the non-operational state.

The reference signal, and a feedback signal to the PD 106, outputted from the LPF 105c, are controlled so as to be identical in frequency and phase to each other by the PM loop, so that phase and frequency modulation components contained in the reference signal in the output of the VGA 108a are reproduced, and the center frequency is converted into a frequency dependent on the first and second carrier frequencies as with the operation of the offset PLL as previously described. That is, the PM loop comes to be in sync in phase with the reference signal generated from the input signals.

Meanwhile, an envelope of the reference signals, and the feedback signal to the AMD 111, outputted from the LPF 105c, are controlled so as to be identical in frequency and phase to each other by the AM loop. As a result, the envelope contained in the reference signal in the output of the VGA 108a is reproduced. That is, the AM loop follows up an amplitude at the envelope of the reference signals.

As a result of studies by the inventors, the open-loop bandwidths of the AM loop and the PM loop, respectively, are designed for about 1.8 MHz due to the trade-off between a noise level and modulation accuracy. The SW1 included in the LPF 105b of the PM loop is used in the shorted state.

Next, an operation in the GSM mode is described.

In this case, circuits necessary only for the operation of the AM loop, as previously described, that is, the AMD 111, VIC 112, and SC1 are set to be in the non-operational state. Further, the SW2 is in the open state, the SC2 is in the operating state, and the SW3 is in the shorted state, whereupon the output voltage of the SC2 is inputted to the LDO 113. That is, in contrast with the case of the EDGE mode, a control terminal voltage of the VGA 108a is determined by a fixed potential outputted by the SC2.

As a result of studies by the inventors, the open-loop bandwidth of the PM loop in the GSM mode is designed for about 1 MHz due to the trade-off between a noise level and modulation accuracy. The SW1 included in the LPF 105b of the PM loop is used in the opened state, and the gain of the PD 106 is controlled to a value differing from that in the case of the EDGE mode such that the bandwidth and phase margin of the PM loop become optimum. Thus, because the optimum open-loop bandwidth of the PM loop for the GSM mode differs from that for the EDGE mode, the SW1 is used to enable the optimum loop characteristic to be implemented in either the GSM mode or the EDGE mode, and the gain of the PD 106 is controlled.

The present example of the configuration, described as above, has the following effects:

(1) By applying the PM loop to the quadrature modulation signal outputted by the LPF 105a in the case of the GSM mode, and applying the PM loop and the AM loop thereto in the case of the EDGE mode, respectively, it is possible to implement a transmitter capable of coping with the constant amplitude modulation (GSM), and the nonconstant amplitude modulation (EDGE).

(2) By setting the optimum PM loop bandwidth for the GSM mode, and the EDGE mode, respectively, it is possible to concurrently secure noise reduction and modulation accuracy.

(3) The PA output power control feedback loop comprising the VGA 108b, and the fixed-gain PA 122a is formed independently from the AM loop, and the PM loop, respectively, in order to control the PA output power. Consequently, the PA 122a need not be of a variable gain type, but may be of a fixed gain type, so that designing of the PA 122a is rendered easier.

As a result of more detailed studies conducted by the inventors, however, the following problems have been found out with the example of the configuration, described as above. More specifically, GSM and EDGE specifications call for an operation to execute transmission in the EDGE mode after execution of transmission in the GSM mode, or an operation contrary to the former, that is, an operation for executing transmission in the GSM mode after execution of transmission in the EDGE mode. However, a problem has been found out in that it is difficult to complete such a changeover between the modes within time as called for by the specifications.

Figure 8:
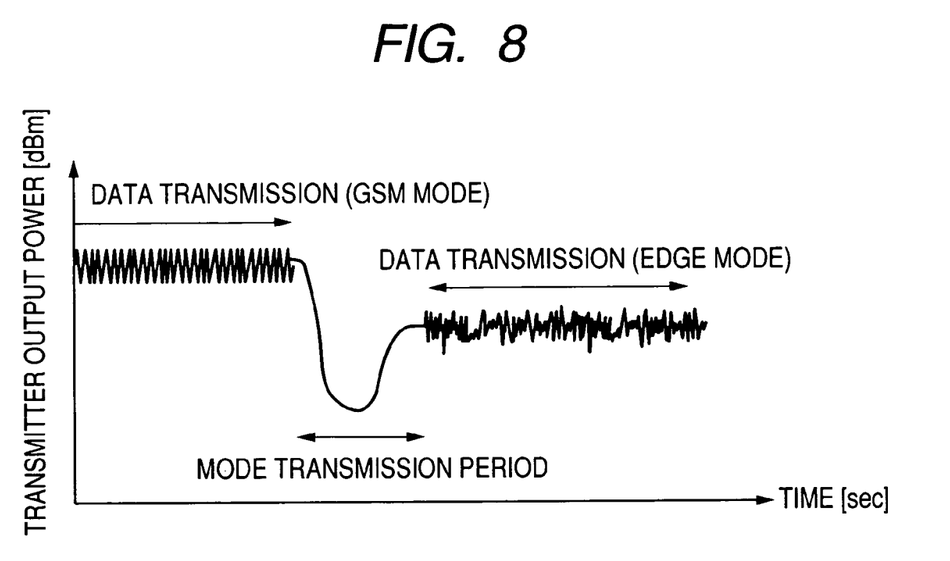
FIG. 8 is a diagram showing an example of an operation of a transmitter in the case of changeover from the GSM mode to the EDGE mode.

FIG. 8 shows an example of an operation of a transmitter in the case of executing transmission in the EDGE mode after execution of transmission in the GSM mode. The horizontal axis indicates time, and the vertical axis a transmission output power from an antenna. At first, data transmission in the GSM mode is executed. Subsequently, data transmission in the EDGE mode is executed with the elapse of a mode transition period. The mode of the transmitter is changed over from GSM to EDGE during the mode transition period, but because a settling operation of the feedback loops, such as the AM loop, and the PM loop, is carried out in the EDGE mode, there is a possibility that fluctuation occurs to an antenna output power, thereby releasing unnecessary signals.

Accordingly, as shown in FIG. 8, the antenna output power is generally once dropped to a lower level during the mode transition period by controlling the voltage Vramp in FIG. 7 before execution of the changeover between the modes. The changeover between the modes is executed, for example, at the center point of the mode transition period. Thereafter, the antenna output power is raised to a predetermined level in the EDGE mode by controlling the voltage Vramp, and the data transmission is thereby started. There are requirements for completion of settling of the feedback loops, such as the AM loop, and the PM loop, before starting the data transmission in the EDGE mode.

According to the GSM, and EDGE specifications, the mode transition period is specified to be about 20 μsec at the minimum, so that if the changeover between the modes is to be executed at the center point of the mode transition period, it is required that the changeover from the GSM mode to the EDGE mode, and the settling of the AM loop and the PM loop be completed within 10 μsec. With the example of the configuration, described as above, however, it is difficult to meet the above requirements for the following reasons.

With the example of the configuration, described as above, the VIC 112, and the AMD 111 comes to be in the non-operational state at the time of the GSM mode, so that output potentials of the VIC 112, and the AMD 111, respectively, turn to 0V. Further, an input potential of the LDO 113 turns to 0V or close to 0V because the SC2 turns into the non-operational state at the instant of changeover to the EDGE mode, and the SW3 turns into the open state. On the other hand, taking into consideration an input voltage range of the VIC 112, and an output voltage range of the AMD 111, the average output potential of the AMD 111, in the EDGE mode, is generally designed to be at about half a power supply voltage, for example, at 1.4V. Further, the input potential of the LDO 113 comes to be at a value corresponding to the output power of the VGA 108a, for example, at 1.8V. Accordingly, the output potential of the AMD 111, and the input potential of the LDO 113 need be recharged to, for example, 1.4V and 1.8V, respectively, after control of the changeover from the GSM mode to the EDGE mode is executed, and a problem has been encountered in that time required for the settling of the AM loop becomes longer because of large magnitude of potential, to be recharged.

Figure 9:
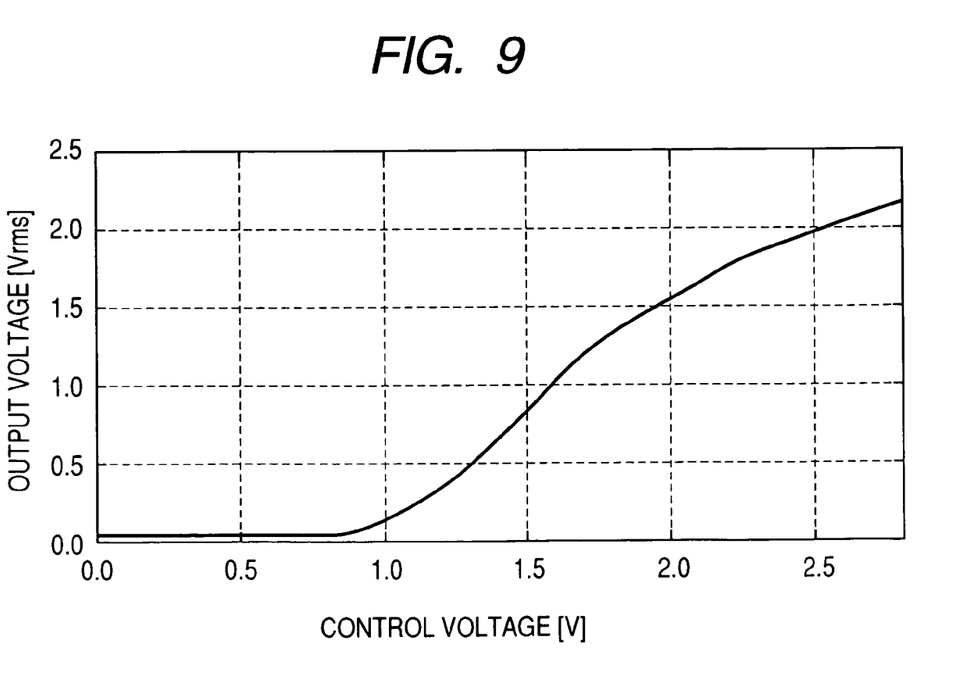
FIG. 9 is a diagram showing the characteristic of a variable-gain amplifier by way of example.

Further, another problem is described hereinafter by referring to the representative output voltage of the VGA 108a having dependence on a control voltage, as shown in FIG. 9. Upon the changeover from the GSM mode to the EDGE mode, the control potential of the VGA 108a is at 0V as described above, and settling proceeds from 0V to a settling potential at the time of the EDGE mode. According to FIG. 9, the output voltage is at approximately 0V with the control voltage of the VGA 108a in the range of from 0V to the neighborhood of 0.8V, and there is hardly any change in the output voltage. It therefore follows that the VGA 108a's response to a rise in the control potential is slow when the control potential is in the neighborhood of 0V, eventually resulting in slow settling time of the AM loop.

It is therefore an object of the invention to solve the problems described in the foregoing, and to speed up mode transition between a mode for handling the nonconstant amplitude modulation, and a mode for handling the constant amplitude modulation in a dual mode transmitter capable of handling two modulation methods for the nonconstant amplitude modulation and the constant amplitude modulation, respectively.

The above-described problems of the invention can be effectively solved by recharging (recharging to, for example, an intermediate potential between the power supply voltage and the ground potential) at least one unit of capacitor of at least one unit of filter included in the AM loop when operated in a mode (for example, a mode for handling the constant amplitude modulation) where the envelope feedback loop (the AM loop) is not used for generation of the transmission signal to be sent out.

More specifically, the representative configuration of the invention is briefly described as follows. That is, a transmitter according to the present invention comprises a first variable-gain amplifier, a second variable-gain amplifier having an input terminal electrically connected to an output terminal of the first variable-gain amplifier, a phase feedback loop for synchronizing a phase of an output signal of the first variable-gain amplifier with a phase of a reference signal generated on the basis of a transmission signal as inputted, and an envelope feedback loop for causing an envelope of output signals of the first variable-gain amplifier to follow up an envelope of the reference signals, and the transmitter is capable of coping with a first transmission mode using the envelope feedback loop to generate a transmission signal to be sent out, and a second transmission mode not using the envelope feedback loop to generate a transmission signal to be sent out. Further, the transmitter has features in that the first variable-gain amplifier is shared by the phase feedback loop, and the envelope feedback loop, and is configured so that synthesis of phase information outputted by the phase feedback loop, and envelope information outputted by the envelope feedback loop is implemented by gain control, and the second variable-gain amplifier is configured so that average power of a transmission signal to be sent out is controlled.

The phase feedback loop is shared between the first and second transmission modes when generating a transmission signal to be sent out, and the envelope feedback loop comprising an envelope comparator for outputting a difference between the envelope of the reference signals and an envelope of feedback signals as fed back by the envelope feedback loop and filters for passing a lower frequency component of an output signal of the envelope comparator.

The filters comprise capacitors, and the capacitors are recharged during a period when operated in the second transmission mode, and a settling operation of the envelope feedback loop after transition of operation from the second transmission mode to the first transmission mode is executed by use of the potential of the capacitors as recharged.

With the transmitter according to the invention, capable of coping with two modulation systems, that is, a modulation method not using the envelope feedback loop (for example, a constant amplitude modulation method), and a modulation method using the envelope feedback loop (foe example, a nonconstant amplitude modulation method), hopes run high that transition time between a transmission mode not using the envelope feedback loop, and a transmission mode using the envelope feedback loop is shortened (transition is speeded up).

DETAILED DESCRIPTION OF THE PREFERRED EMBODIMENTS

Embodiments of a transmitter, and a mobile communication terminal using the same, according to the invention, are described in more details hereinafter with reference to the accompanying drawings. There are picked up hereinafter the GSM system using the GMSK modulation as a constant amplitude modulation method, and the EDGE system using the 8 PSK modulation as a nonconstant amplitude modulation method for explanation, however, it is to be pointed out that the present invention is not limited to these communication systems, and can obviously be applied to constant amplitude modulation methods, and nonconstant amplitude modulation methods across-the-board.

Figure 1:
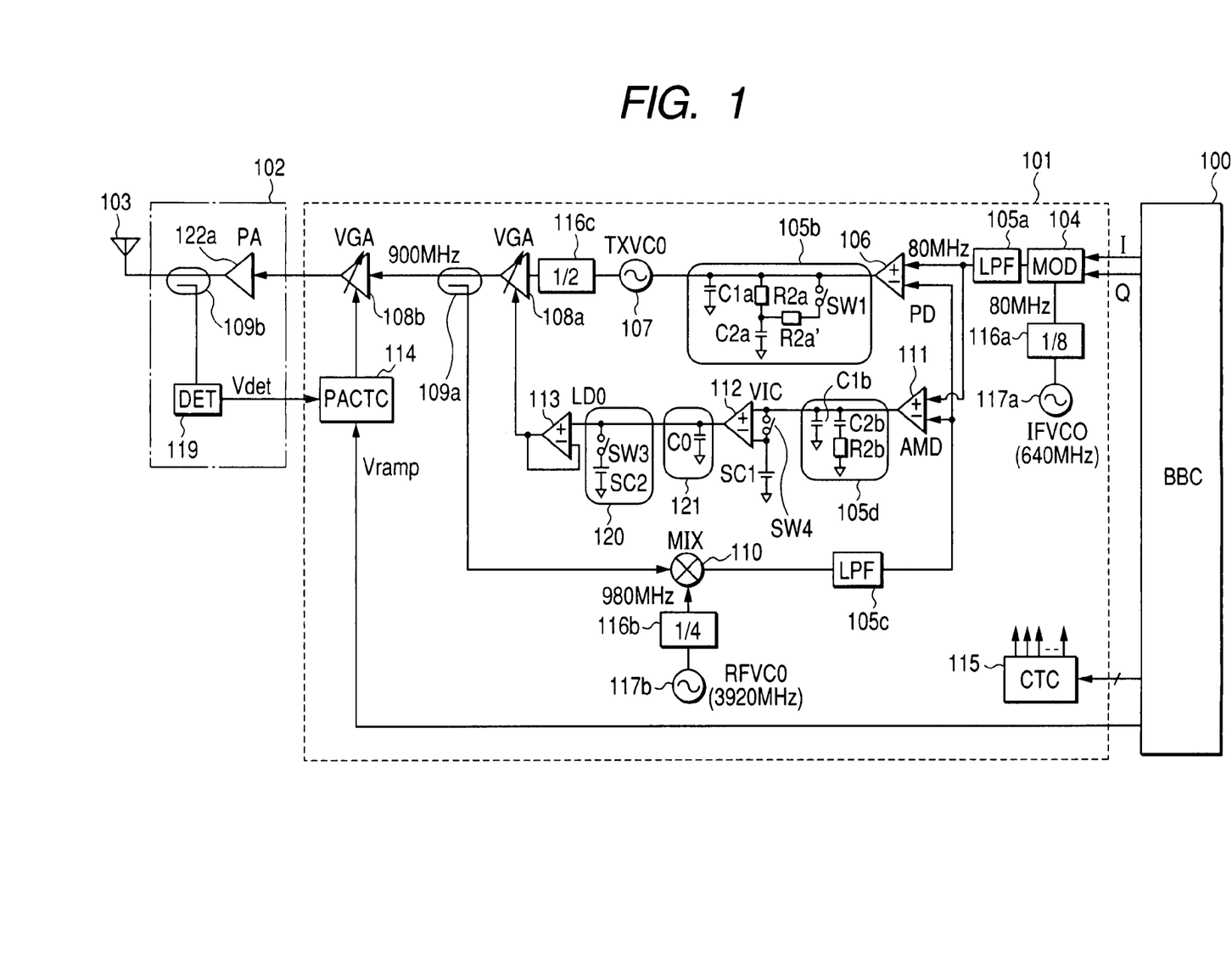
FIG. 1 is a block diagram showing a first embodiment of a transmitter according to the invention.

FIG. 1 is a block diagram showing a first embodiment of a transmitter according to the invention. The transmitter according to the present embodiment has a feature in that with the example of the configuration, studied by the inventor prior to the development of the present invention, as shown in FIG. 7, an SW4 (a first switch) is added between the two input terminals of the VIC 112, and the SW2 is dispensed with. The SW3 (a second switch) is used as it is. In FIG. 1, parts identical or similar in function to those in FIG. 7 are denoted by like reference numerals, thereby omitting duplication in explanation.

An operation of the present embodiment is described hereinafter. First, the operation in the GSM mode, that is, a transmission mode where the envelope feedback loop is not used.

The SW3 is in the shorted state, and an SC2 turns into the operating state. As a VIC 112 turns into the non-operational state, a control potential of a VGA 108a is dependent on an output potential (a second intermediate potential between a power supply voltage and the ground potential) of the SC2, and the SC2 concurrently recharges a capacitor C0 of an integrator 121 to the output potential of the SC2. Meanwhile, an SC 1 is in the operating state, and the SW4 turns into the shorted state. Accordingly, capacitors C1b and C2b, included in an LPF 105d, are recharged by the SC 1, and a minus input terminal of the VIC 112 is recharged to a potential identical to an output potential (a first intermediate potential between a power supply voltage and the ground potential) of the SC 1.

Next, the operation in the EDGE mode, that is, a transmission mode where the envelope feedback loop is used.

In the EDGE mode, in order to turn the AM loop into the operating state, the SW3 and the SW 4 are turned into the open state, and the SC2 turns into the non-operational state. Since the capacitors C0, C1b, and C2b have been recharged at the time of the GSM mode, a plus input terminal potential of an LDO 113, and a plus input terminal of the VIC 112 are not at 0V upon changeover to the EDGE mode, but held at an operational potential at the time of the GSM mode, closer to an operational potential at the time of the EDGE mode than 0V. Hence, it is possible to implement faster settling time of the AM loop when changeover from the GSM mode to the EDGE mode is executed.

Furthermore, as described above, because an output potential of the LDO 113 immediately after the changeover to the EDGE mode, that is, the control potential of the VGA 108a is not at 0V, but comes to be identical to the output potential of the SC2 in use at the time of the GSM mode, it is possible to avoid a region where the VGA 108a's response is slow, thereby implementing faster settling time of the AM loop.

As described in the foregoing, with the present embodiment, it becomes possible to speed up mode transition between a mode for handling the constant amplitude modulation, and a mode for handling the nonconstant amplitude modulation. In the case where the capacitors C1b, C2b each have a small capacitance, and recharging time thereof is very short, recharging of the capacitors C1b, C2b can be at times omitted. Meanwhile, in the case where it is possible to adopt a variable-gain amplifier having a very narrow region where the VGA 108a's response is slow, recharging of the capacitor C0 can be at times omitted.

Figure 2:
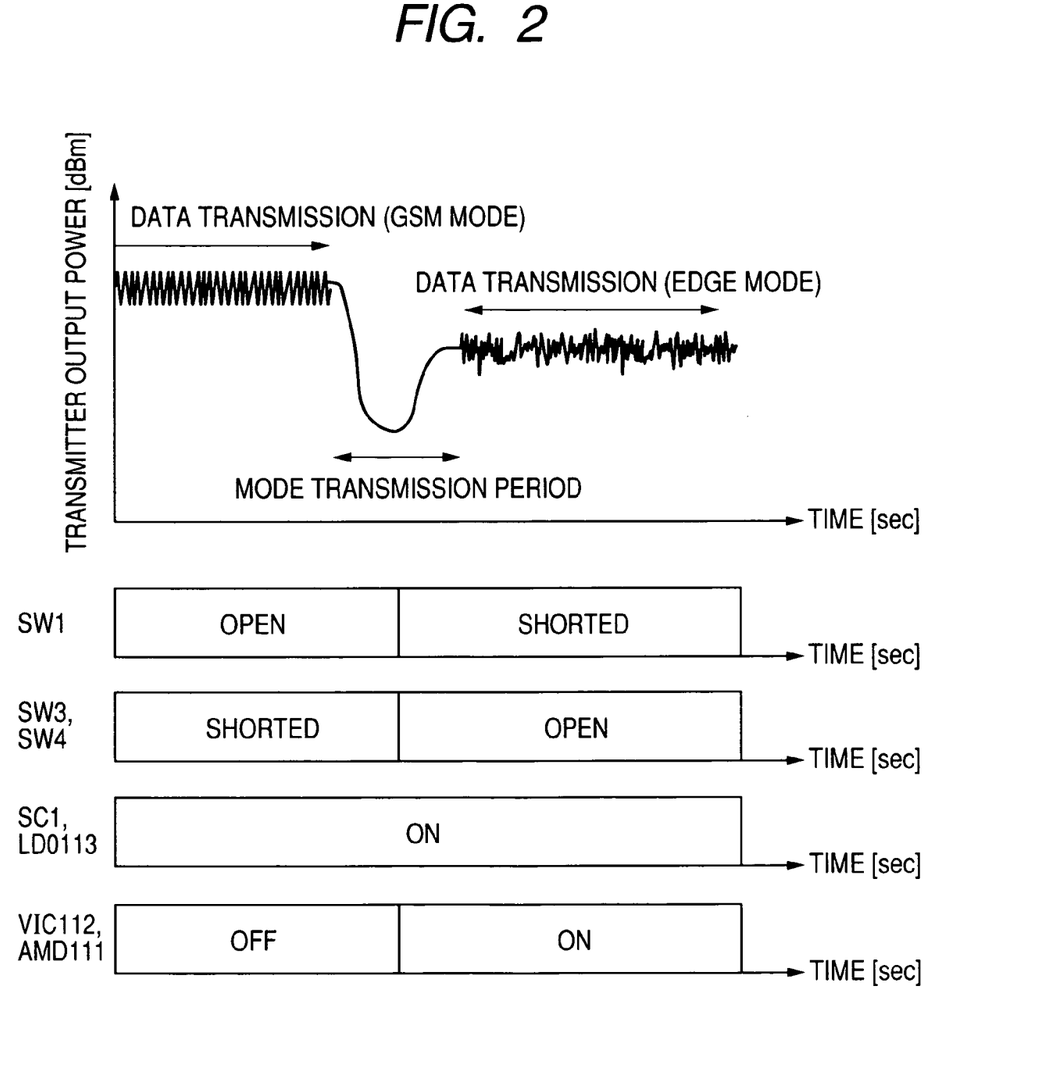
FIG. 2 is view showing the operation of the transmitter according to the first embodiment.

FIG. 2 shows the operation as summed up. In the upper part in FIG. 2, there is shown the operation of the transmitter in the case of executing transmission in the EDGE mode after execution of transmission in the GSM mode, and respective states of the SW1, the SW3 and SW4, the SC1 and LDO 113, and the VIC 112 and an AMD 111, corresponding to the operation as above, are also shown in the figure.

Figure 3:
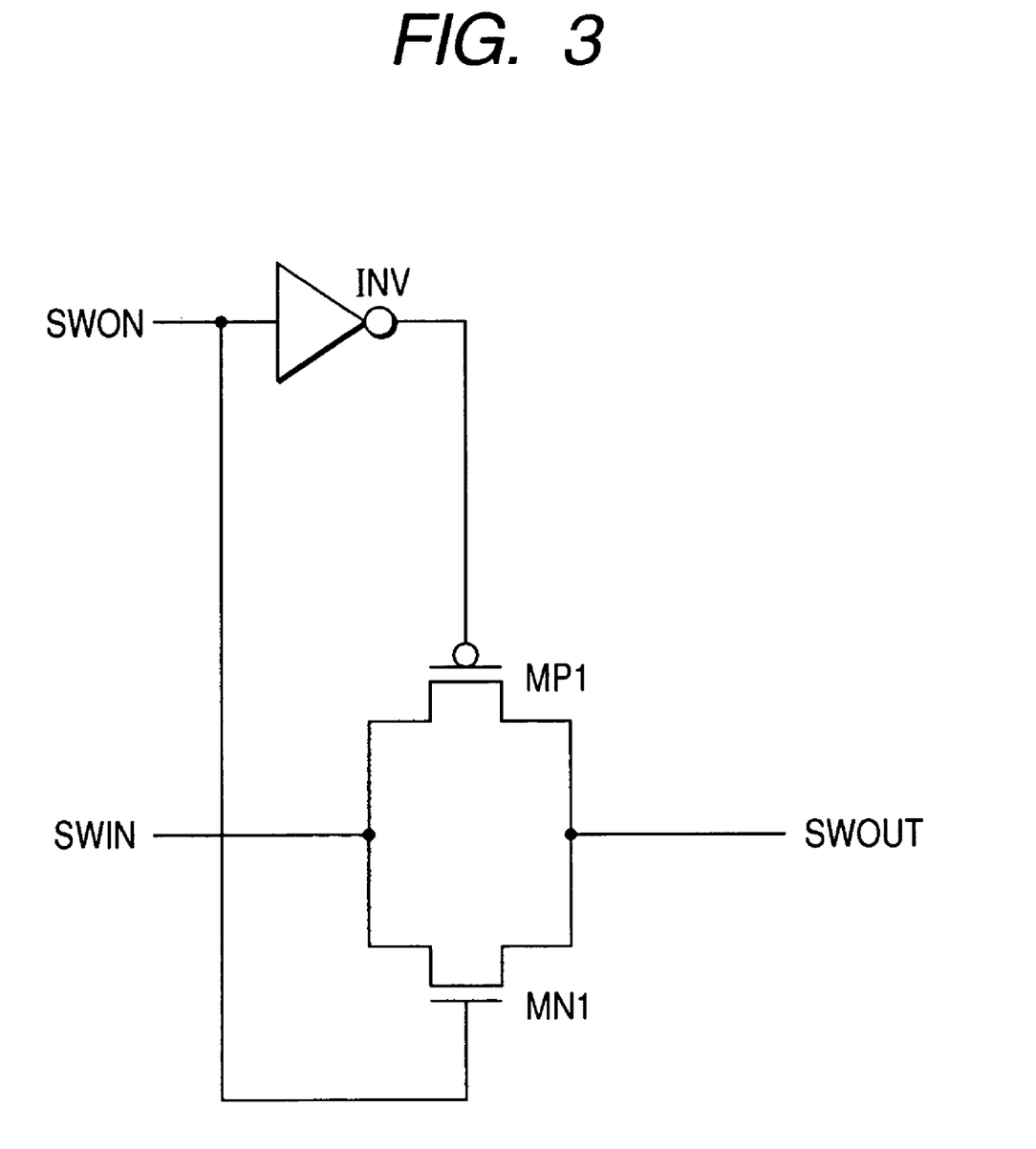
FIG. 3 is a circuit diagram for describing an example of a switch for use in the first embodiment.

FIG. 3 is a view showing an example of respective circuit diagrams of the SW3 and SW4 according to the present embodiment. Respective switches, the SW3 and SW4, are switches each comprising an nMOS (Metal Oxide Semiconductor) transistor MN1, a PMOS transistor MP1, and an inverter INV, and SWIN denotes an input terminal while SWOUT denotes an output terminal. Further, a control signal supplied from a control circuit 115 is inputted to a terminal SWON, and the switch is in the shorted state when the control signal is Hi while the switch is in the open state when the control signal is Lo.

Figure 4:
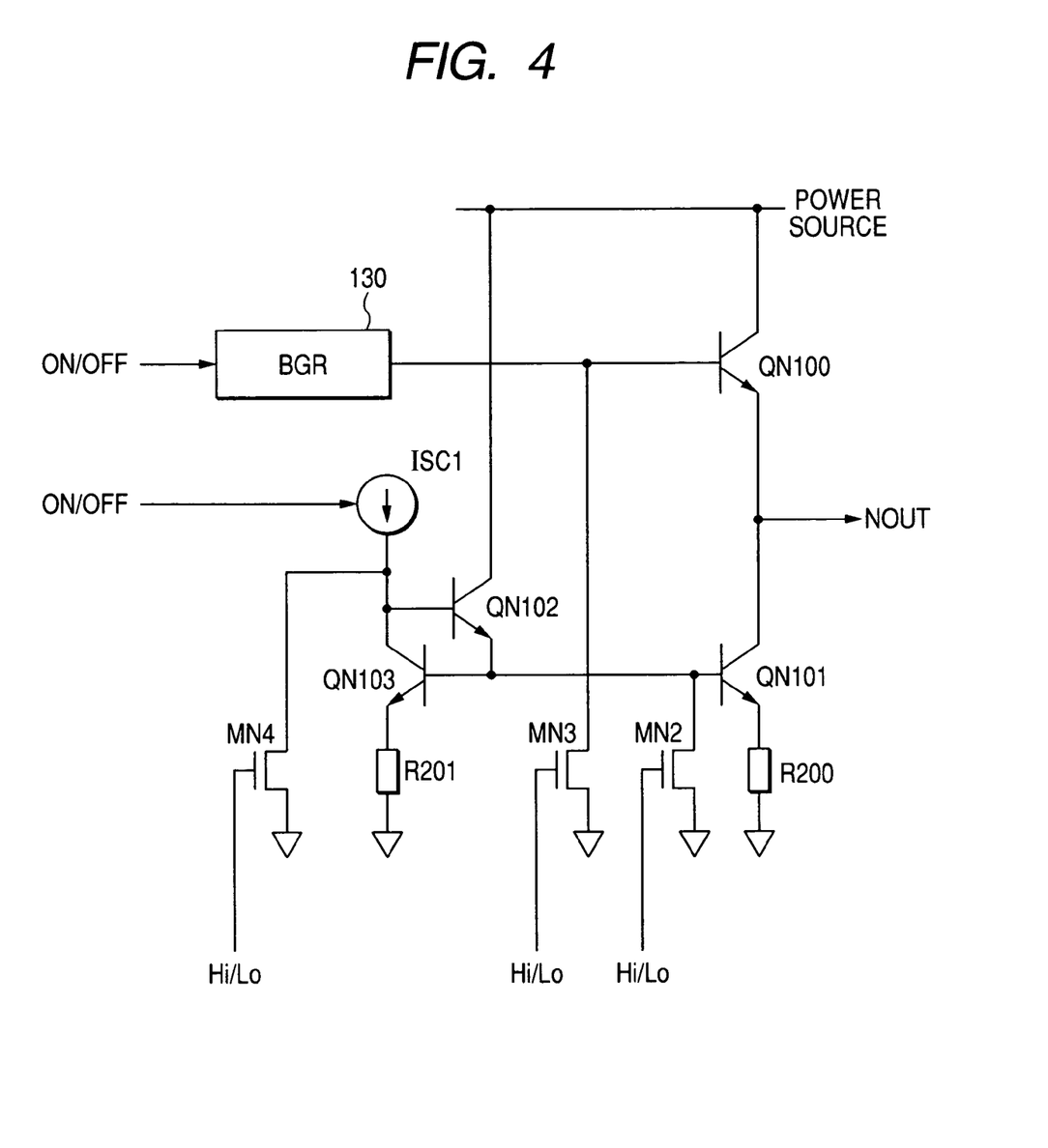
FIG. 4 is a circuit diagram for describing an example of a constant-voltage supply circuit according to the first embodiment.

A constant-voltage circuit 120 can have a configuration where the SW3 shown in FIG. 3, and the constant-voltage supply SC2 are connected in series to each other, however, as another example, the constant-voltage circuit 120 can have a configuration shown in FIG. 4. FIG. 4 is a view showing an example of a circuit diagram of the constant-voltage supply SC2 according to the present embodiment. The circuit 120 comprises a current mirror comprising npn transistors QN101, QN 102, QN103, a constant current supply ISC1, resistors R200, R201, an npn transistor QN100, together with the current mirror circuit, forming an emitter follower, a band gap reference circuit (BGR) 130 for generating a voltage of the constant-voltage supply SC2, and nMOS transistors MN2, MN3, MN4, used for the SW3 as an ON/OFF switch. ON/OFF of the band gap reference circuit 130 and the constant current supply ISC1, respectively, and the open state/the shorted state (Hi/Lo) of the transistors MN2, MN3, MN4, respectively, are controlled by the control signal supplied from the control circuit 115. NOUT denotes an output terminal of the circuit 120, and the output terminal is connected to a plus input terminal of the LDO 113.

In the case of the GSM mode, control is made such that the band gap reference circuit 130 and the constant current supply ISC1 are turned ON, respectively, and the transistors MN2, MN3, MN4 each are turned into the open state. As a result, the circuit 120 outputs a predetermined voltage to NOUT.

In the case of the EDGE mode, control is made such that the band gap reference circuit 130 and the constant current supply ISC1 are turned OFF, respectively, and the transistors MN2, MN3, MN4 each are turned into the shorted state. As a result, the output impedance of the circuit 120 turns into a high impedance, so that it is possible to prevent the circuit 120 from exerting an adverse effect on the operation of the AM loop.

Further, with the present embodiment described as above, a power amplification section 102 is integrated as a module, and a transmitter 101 is integrated as an IC (Integrated Circuit).

Figure 5:
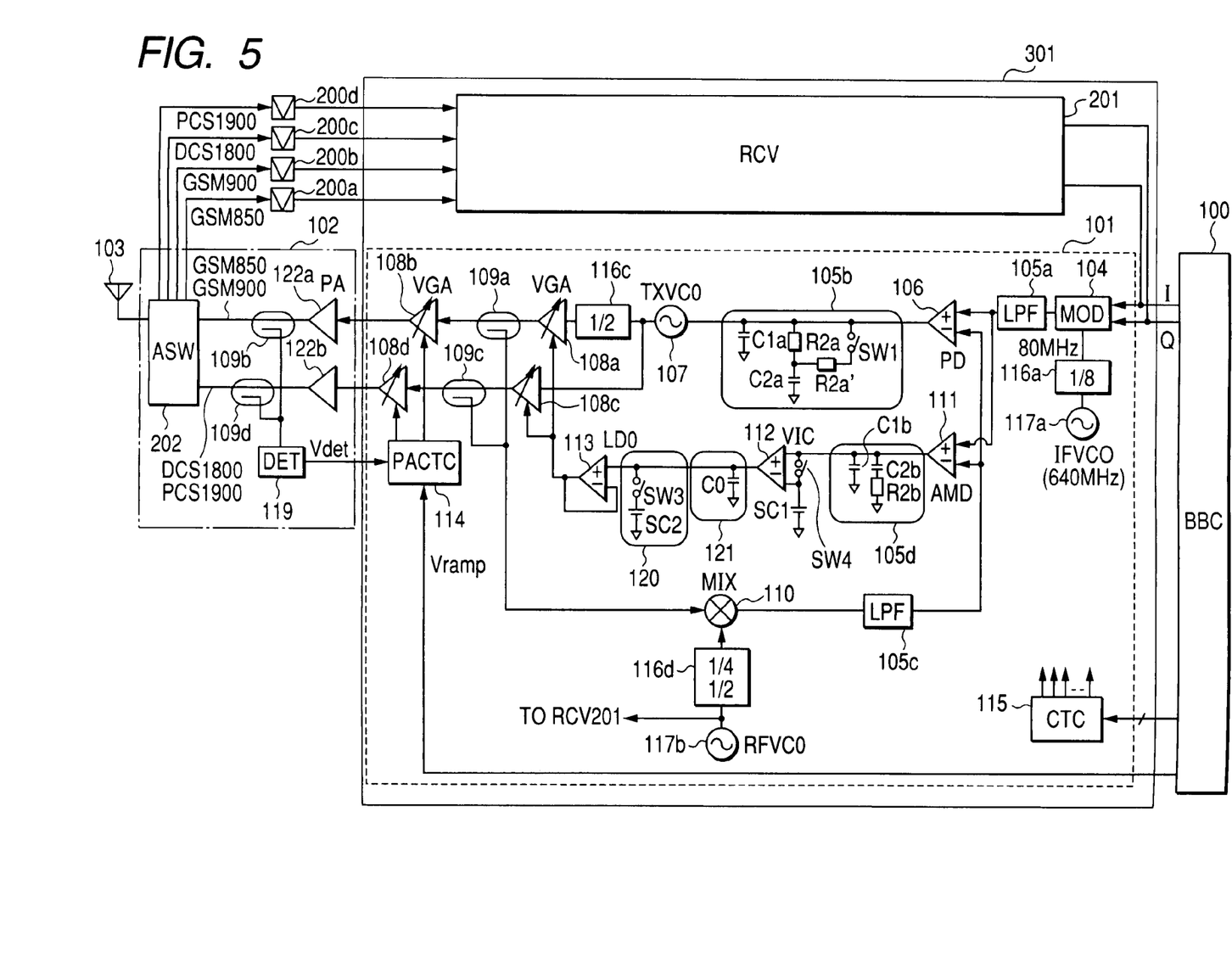
FIG. 5 is a block diagram showing a second embodiment of a mobile communication terminal according to the invention.

FIG. 5 is a block diagram showing a second embodiment of a mobile communication terminal according to the invention, using the transmitter according to the first embodiment. The mobile communication terminal according to the present embodiment is capable of coping with two modes (GSM: the GMSK modulation and EDGE: the 8 PSK modulation). Further, the mobile communication terminal is capable of coping with four frequency bands in transmitting and receiving operations, that is, a band designated as GSM 850 (transmission frequency in the range of 824 to 849 MHz, receive frequency in the range of 869 to 894 MHz), a band designated as GSM 900 (transmission frequency in the range of 880 to 915 MHz, receive frequency in the range of 925 to 960 MHz), a band designated as DCS 1800 (transmission frequency in the range of 1710 to 1785 MHz, receive frequency in the range of 1805 to 1880 MHz), and a band designated as PCS 1900 (transmission frequency in the range of 1850 to 1910 MHz, receive frequency in the range of 1930 to 1990 MHz). In GSM and EDGE, any of the above bands is used according to an application purpose.

As shown in FIG. 5, with a transmitter 101, a VGA 108c, a signal branch circuit 109c, and a VGA 108d are added to the transmitter 101 according to the first embodiment. Further, in place of the ¼-divider 116b, use is made of a divider 116d capable of changeover between 4-divisions and 2-divisions. Further, in a power amplification section 102, a fixed-gain PA 122b, a signal branch circuit 109d, and an antenna switch (ASW) 202 are added to the power amplification section 102 according to the first embodiment.

Furthermore, in FIG. 5, reference numeral 301 denotes a transmitting and receiving apparatus comprising the transmitter 101, and a receiver 201 to be described later, integrated as an IC (RF-IC). The power amplification section 102 in FIG. 5 is integrated as a module, In the case of a frequency band being GSM 850 and GSM 900, the VGA 108c, VGA 108d, and fixed-gain PA 122b are set to the non-operational state. Further, the divider 116d operates as a ¼-divider. The operation of the second embodiment, in other respects, is the same as that for the first embodiment.

Meanwhile, in the case of a frequency band being DCS 1800 and PCS 1900, the ½-divider 116c, VGA 108a, VGA 108b, and fixed-gain PA 122a are set to the non-operational state. Further, the divider 116d operates as a ½-divider. The operation of the second embodiment, in other respects, is the same as that for the first embodiment. The TXVCO 107 oscillates in a frequency band of 1.8 GHz for all the bands GSM 850, GSM 900, DCS 1800, and PCS 1900.

Receive signals outputted from SAW filters 200a, 200b, 200c, and 200d, respectively, are inputted to the receiver 201 of the transmitting and receiving apparatus 301, and demodulated I, Q baseband signals are outputted to the baseband circuit 100. For a local signal used in frequency conversion to be executed by the receiver 201, an output signal of the RFVCO 117b is used, and appropriate processing, such as frequency division, and so forth, is applied thereto inside the receiver 201 before being put to use.

In the case of GSM 850 and GSM 900, the antenna switch 202 connects the output of the signal branch circuit 109b to the antenna 103 at the time of transmission, and in the case of DCS 1800 and PCS 1900, the antenna switch 202 connects the output of the signal branch circuit 109d to the antenna 103 at the time of transmission. The antenna switch 202 can incorporate a filter for restraining unnecessary signals at the time of transmission. Further, at the time of receiving, the antenna switch 202 connects the antenna 103 to the SAW filter 200a in the case of GSM 850, connects the antenna 103 to the SAW filter 200b in the case of GSM 900, connects the antenna 103 to the SAW filter 200c in the case of DCS 1800, and connects the antenna 103 to the SAW filter 200d in the case of PCS 1900.

Now, circuits of the transmitting and receiving apparatus integrated in the IC, and the power amplification section 102 integrated in the module, respectively, are not to be limited to an example shown in FIG. 5. With power amplification section 102, for example, the antenna switch 202, and the signal branch circuits 109b, 109d may be separated from the module to be then integrated in another module. Further, as for a configuration of the receiver 201, a direct conversion method of directly converting the frequency of a receive signal into the baseband I, Q signals are adopted, however, the configuration of the receiver 201 is not limited thereto, and obviously, there may be adopted another conversion method of converting the frequency of the receive signal into the baseband I, Q signals via an intermediate frequency.

Thus, with the present embodiment, use is made of the transmitter capable of speeding up mode transition between the mode for handling the nonconstant amplitude modulation, and the mode for handling the constant amplitude modulation, so that hopes run high that a multi-mode mobile communication terminal capable of executing changeover between modes with reliability is implemented.

With the first embodiment of the invention, it is possible to decrease a value of voltage to be recharged accompanying a mode changeover from the constant amplitude modulation to the nonconstant amplitude modulation, thereby implementing fast mode transition time. For example, if the at least one unit of capacitor, to be recharged, includes the capacitors of the LPF 105d, a value of voltage to be recharged to the capacitors of the LPF 105d can be decreased, thereby enabling fast mode transition time to be implemented, and further, if the at least one unit of capacitor, to be recharged, includes the capacitor of the integrator 121, the region where the VGA 108a's response is slow can be avoided, similarly enabling fast mode transition time to be implemented.

What is claimed is:

1. A transmitter comprising:
a first variable-gain amplifier;
a second variable-gain amplifier having an input terminal electrically connected to an output terminal of the first variable-gain amplifier;
a phase feedback loop for synchronizing a phase of an output signal of the first variable-gain amplifier with a phase of a reference signal generated on the basis of a transmission signal as inputted; and
an envelope feedback loop for causing an envelope of output signals of the first variable-gain amplifier to follow up an envelope of the reference signals,
said transmitter being capable of coping with a first transmission mode using the envelope feedback loop to generate a transmission signal to be sent out, and a second transmission mode not using the envelope feedback loop to generate a transmission signal to be sent out,
the first variable-gain amplifier being shared by the phase feedback loop, and the envelope feedback loop, and configured so that synthesis of phase information outputted by the phase feedback loop, and envelope information outputted by the envelope feedback loop is implemented by gain control,
the second variable-gain amplifier being configured so that average power of a transmission signal to be sent out is controlled,
the phase feedback loop being shared between the first and second transmission modes when generating a transmission signal to be sent out, and
the envelope feedback loop comprising an envelope comparator for outputting a difference between the envelope of the reference signals and an envelope of feedback signals as fed back by the envelope feedback loop and filters for passing a lower frequency component of an output signal of the envelope comparator,
wherein the filters comprise capacitors, and the capacitors are recharged during a period when operated in the second transmission mode, a settling operation of the envelope feedback loop after transition of operation from the second transmission mode to the first transmission mode being executed by use of the potential of the capacitors as recharged.

2. The transmitter according to claim 1,
wherein the filters includes a first filter connected to an output of the envelope comparator, and a second filter for receiving an output current of the first filter, and the capacitors include first capacitors included in the first filter, and a second capacitor in the second filter to be recharged with the output current,
the envelope feedback loop comprising:
a first power supply having a first intermediate potential at an intermediate potential between a power supply voltage and the ground potential;
a second power supply having a second intermediate potential at an intermediate potential between a power supply voltage and the ground potential;
a voltage-to-current converter having a plus input terminal and a minus input terminal, for generating the output current of the first filter by an output of the first filter being connected to the plus input terminal, and the first power supply being connected to the minus input terminal;

a first switch for interconnecting the plus input terminal, and the minus input terminal; and a second switch for interconnecting the second filter, and the second power supply, and wherein in the case of the reference signal being a constant amplitude modulation signal, the first capacitors are recharged to the first intermediate potential due to the first switch coming into the shorted state, and the second capacitor is recharged to the second intermediate potential due to the second switch coming into the shorted state while in the case of the reference signal being a nonconstant amplitude modulation signal, the first switch comes to be in the open state, and the second switch comes to be in the open state, envelope information being generated on the basis of an output signal of the second filter.

3. The transmitter according to claim 2,
wherein the second switch comprises transistors, and the second switch comes to be in the shorted state upon the transistors turning ON while the second switch comes to be in the open state upon the transistors turning OFF.

4. The transmitter according to claim 1,
wherein the phase feedback loop comprises a phase comparator for outputting a difference between a phase of the reference signal, and a phase of a feedback signal as fed back by the phase feedback loop, an additional filter for passing a lower frequency component of an output signal of the phase comparator, and an oscillator where the frequency, and phase of an oscillation signal are controlled by an output signal of the additional filter, phase information being outputted from the oscillator.

5. The transmitter according to claim 4,
wherein a cutoff frequency of the additional filter in the case of the reference signal being a nonconstant amplitude modulation signal is higher than that in the case of the reference signal being a constant amplitude modulation signal.

6. A mobile communication terminal comprising:
a baseband circuit for processing baseband signals;
a transmitter for receiving transmission-baseband signals outputted from the baseband circuit, and generating a transmission signal on the basis of the transmission-baseband signals;
a power amplifier for amplifying the transmission signal;
a receiver for outputting receive-baseband signals to the baseband circuit;
an antenna switch for changing over between connection to an output of the power amplifier, and connection to an output to the receiver;
an antenna connected to the antenna switch; and
a band-pass filter for interconnecting the antenna switch, and the receiver,
the receiver receiving a receive signal received by the antenna through the intermediary of the band-pass filter to thereby generate the receive-baseband signals,
said transmitter comprising:
a first variable-gain amplifier;
a second variable-gain amplifier having an input terminal electrically connected to an output terminal of the first variable-gain amplifier;
a phase feedback loop for synchronizing a phase of an output signal of the first variable-gain amplifier with a phase of a reference signal generated on the basis of a transmission signal as inputted; and an envelope feedback loop for causing an envelope of output signals of the first variable-gain amplifier to follow up an envelope of the reference signals, said transmitter being capable of coping with a first transmission mode using the envelope feedback loop to generate a transmission signal to be sent out, and a second transmission mode not using the envelope feedback loop to generate a transmission signal to be sent out, the first variable-gain amplifier being shared by the phase feedback loop, and the envelope feedback loop, and configured so that synthesis of phase information outputted by the phase feedback loop, and envelope information outputted by the envelope feedback loop is implemented by gain control, the second variable-gain amplifier being configured so that average power of a transmission signal to be sent out is controlled, the phase feedback loop being shared between the first and second transmission modes when generating a transmission signal to be sent out, and the envelope feedback loop comprising an envelope comparator for outputting a difference between the envelope of the reference signals and an envelope of feedback signals as fed back by the envelope feedback loop and filters for passing a lower frequency component of an output signal of the envelope comparator, wherein the filters comprise capacitors, and the capacitors are recharged during a period when operated in the second transmission mode, a settling operation of the envelope feedback loop after transition of operation from the second transmission mode to the first transmission mode being executed by use of the potential of the capacitors as recharged.

7. The mobile communication terminal according to claim 6,
wherein the baseband circuit, transmitter, power amplifier, receiver, band-pass, antenna switch, and antenna are configured so as to enable transmitting-receiving by the constant amplitude modulation signal, and transmitting-receiving by the nonconstant amplitude modulation signal to be executed in at least one frequency band.

8. The mobile communication terminal according to claim 6,
wherein the filters includes a first filter connected to an output of the envelope comparator, and a second filter for receiving an output current of the first filter, and the capacitors include first capacitors included in the first filter, and a second capacitor in the second filter to be recharged with the output current,
the envelope feedback loop comprising:
a first power supply having a first intermediate potential at an intermediate potential between a power supply voltage and the ground potential;
a second power supply having a second intermediate potential at an intermediate potential between a power supply voltage and the ground potential;
a voltage-to-current converter having a plus input terminal and a minus input terminal, for generating the output current of the first filter by an output of the first filter being connected to the plus input terminal, and the first power supply being connected to the minus input terminal;
a first switch for interconnecting the plus input terminal, and the minus input terminal; and a second switch for interconnecting the second filter, and the second power supply, and wherein in the case of the reference signal being a constant amplitude modulation signal, the first capacitors are recharged to the first intermediate potential due to the first switch coming into the shorted state, and the second capacitor is recharged to the second intermediate potential due to the second switch coming into the shorted state while in the case of the reference signal being a nonconstant amplitude modulation signal, the first switch comes to be in the open state, and the second switch comes to be in the open state, envelope information being generated on the basis of an output signal of the second filter.

9. The mobile communication terminal according to claim 8, wherein the second switch comprises transistors, and the second switch comes to be in the shorted state upon the transistors turning ON while the second switch comes to be in the open state upon the transistors turning OFF.

10. The mobile communication terminal according to claim 6, wherein the phase feedback loop comprises a phase comparator for outputting a difference between a phase of the reference signal, and a phase of a feedback signal as fed back by the phase feedback loop, an additional filter for passing a lower frequency component of an output signal of the phase comparator, and an oscillator where the frequency, and phase of an oscillation signal are controlled by an output signal of the additional filter, phase information being outputted from the oscillator.

11. The mobile communication terminal according to claim 10, wherein a cutoff frequency of the additional filter in the case of the reference signal being a nonconstant amplitude modulation signal is higher than that in the case of the reference signal being a constant amplitude modulation signal.

* * * * *